United States Patent
Medvedenko

(10) Patent No.: US 9,877,063 B2
(45) Date of Patent: Jan. 23, 2018

(54) INTERACTIVE ADVERTISEMENT

(75) Inventor: Eugene Medvedenko, Kharkiv Region (UA)

(73) Assignee: EchoStar Ukraine L.L.C., Kharkiv Region (UA)

( * ) Notice: Subject to any disclaimer, the term of this patent is extended or adjusted under 35 U.S.C. 154(b) by 135 days.

(21) Appl. No.: 13/825,133

(22) PCT Filed: Sep. 21, 2010

(86) PCT No.: PCT/UA2010/000068
§ 371 (c)(1),
(2), (4) Date: Mar. 20, 2013

(87) PCT Pub. No.: WO2012/039696
PCT Pub. Date: Mar. 29, 2012

(65) Prior Publication Data
US 2013/0185751 A1 Jul. 18, 2013

(51) Int. Cl.
*H04N 7/08* (2006.01)
*H04N 21/43* (2011.01)
(Continued)

(52) U.S. Cl.
CPC ......... *H04N 21/43* (2013.01); *H04N 5/44513* (2013.01); *H04N 21/4122* (2013.01);
(Continued)

(58) Field of Classification Search
None
See application file for complete search history.

(56) References Cited

U.S. PATENT DOCUMENTS 5,900,905 A * 5/1999 Shoff et al. ............ 725/91
2001/0054181 A1 12/2001 Corvin
(Continued)

FOREIGN PATENT DOCUMENTS

WO 0038428 A1 6/2000
WO 0176236 A1 10/2001
(Continued)

OTHER PUBLICATIONS

International Preliminary Report on Patentability for PCT/UA2010/000068, dated Mar. 26, 2013, 7 pages.
(Continued)

*Primary Examiner* — Fernando Alcon
(74) *Attorney, Agent, or Firm* — Kilpatrick Townsend & Stockton LLP

(57) ABSTRACT

Implementations discussed herein are directed to providing interactive advertisements to a viewer of a broadcast or other program service transmission. Interactive advertisements include product offering advertisements that give details regarding sales of specific products or retailers that offering specific products for sale. A user may create a shopping list or other indicator that specifies which product offering advertisements are displayed. Product offering advertisements may be displayed concurrently with content from a program service transmission. Extended product offering advertisement that provide further details regarding a product for sale may be displayed in response to user selections of particular product offering advertisements. Product offering advertisements and/or extended product offering advertisements may be displayed on a front panel screen of a receiver or on a television or other output device used to display program service content.

20 Claims, 6 Drawing Sheets

(51) Int. Cl.
*H04N 5/445* (2011.01)
*H04N 21/478* (2011.01)
*H04N 21/41* (2011.01)
*H04N 21/45* (2011.01)
*H04N 21/4722* (2011.01)
*H04N 21/475* (2011.01)
*H04N 21/488* (2011.01)
*H04N 21/81* (2011.01)

(52) U.S. Cl.
CPC ....... *H04N 21/4532* (2013.01); *H04N 21/478* (2013.01); *H04N 21/4722* (2013.01); *H04N 21/4755* (2013.01); *H04N 21/4882* (2013.01); *H04N 21/812* (2013.01)

(56) References Cited

U.S. PATENT DOCUMENTS

| | | | |
|---|---|---|---|
| 2002/0067376 A1* | 6/2002 | Martin et al. | 345/810 |
| 2003/0212996 A1* | 11/2003 | Wolzien | 725/60 |
| 2005/0028190 A1* | 2/2005 | Rodriguez et al. | 725/22 |
| 2005/0086690 A1 | 4/2005 | Gilfix et al. | |
| 2005/0289588 A1* | 12/2005 | Kinnear | 725/35 |
| 2007/0101360 A1 | 5/2007 | Gutta et al. | |
| 2008/0235090 A1* | 9/2008 | Lundstrom et al. | 705/14 |
| 2008/0244666 A1* | 10/2008 | Moon | H04N 7/17318 725/87 |
| 2009/0054946 A1 | 2/2009 | Sommer et al. | |
| 2009/0254946 A1 | 10/2009 | Vogel | |
| 2010/0145820 A1* | 6/2010 | Johnson | G06Q 30/00 725/117 |
| 2011/0099576 A1* | 4/2011 | Shkedi et al. | 725/34 |

FOREIGN PATENT DOCUMENTS

| | | |
|---|---|---|
| WO | 2009061037 A1 | 5/2009 |
| WO | 2012/039696 | 3/2012 |

OTHER PUBLICATIONS

International Search Report and Written Opinion for PCT/UA2010/000068, dated Jun. 15, 2011, 10 pages.

* cited by examiner

INTERACTIVE ADVERTISEMENT

TECHNICAL FIELD

Implementations discussed herein are directed to providing interactive advertisements to a viewer of a broadcast or other program service transmission.

BACKGROUND

A television broadcast or other program service transmission may include one or more broadcast advertisements. Such advertisements are shown periodically during the display of a particular channel and are familiar to television viewers. For example, a broadcast advertisement may be shown before and after the airing a particular program, as well as at periodic intervals during the program. Broadcast advertisements may feature products and services, such as automobiles, gaming systems, restaurants, recently released films, and so on.

In some instances, a broadcast advertisement may be produced by a local merchant or retailer and shown locally. In this type of broadcast advertisement, the advertisement itself may contain information as to where featured product or service may be purchased. For example, a small business owner with a shop located in the downtown area of particular city may produce a broadcast advertisement that is then shown on local television stations in the city. This type of advertisement may include the shop's address and/or directions to the shop's location.

In other instances, a broadcast advertisement may be produced by merchant or other seller whose products are available through various retailers that located in different areas. For example, an automobile manufacturer may produce a broadcast advertisement for its latest model and that advertisement may air in different cities. In this type of broadcast advertisement, the advertisement may not provide any information as to where or how a product featured in the advertisement may be purchased. For such advertisements, a viewer may wish to purchase the product featured in the advertisement, but may be at a loss as to where or how the product may be purchased.

SUMMARY

Implementations discussed herein are directed to providing interactive advertisements to a viewer of a broadcast or other program service transmission. Interactive advertisements include product offering advertisements that give details regarding sales of specific products or retailers that offering specific products for sale. A user may create a shopping list or other indicator that specifies which product offering advertisements are displayed. Product offering advertisements may be displayed concurrently with content from a program service transmission. Extended product offering advertisement that provide further details regarding a product for sale may be displayed in response to user selections of particular product offering advertisements. Product offering advertisements and/or extended product offering advertisements may be displayed on a front panel screen of a receiver or on a television or other output device used to display program service content.

One embodiment is directed to a receiver, comprising: a tuner operable to receive a program service transmission having a plurality of channels, the tuner operable to select one of the channels responsive to a signal received from an input device and to prepare the channel to be output in a data signal to an external display device; a memory connected to the tuner, the memory including a tangible storage medium operable to store computer readable data and instructions, the memory storing a plurality product offering advertisements; a processor connected to the memory operable to run computer executable code stored in the memory device, the processor operable to process input received from the input device to determine a product selection and to select one or more product offering advertisements that conform to the product selection; and an audio visual module connected to the tuner and to the processor, the audio visual module operable to output the one or more product offering advertisements that conform to the product selection for display to the user.

Another embodiment is directed to a method for providing an interactive advertisement, comprising: receiving a program service transmission at a receiver, the program service transmission having a plurality of channels; outputting at least one channel of the plurality of channels from the receiver for display on a display device; receiving user input at the receiver, the user input including a product selection; and outputting from the receiver at least one product offering advertisement, the at least one product offering advertisement including a product for sale and a location where the product may be purchased, the product for sale conforming to the product selection.

Yet another embodiment is directed to a method for providing an interactive advertisement, comprising: receiving a program service transmission at a receiver, the program service transmission having a plurality of channels and a plurality of product offering advertisements for products that are featured in broadcast advertisements shown on at least one of the channels of the program service transmission; outputting at least one channel of the plurality of channels from the receiver for display on a display device; outputting from the receiver at least one product offering advertisement during display of the at least one channel, the at least one product offering advertisement including a product for sale and a location where the product may be purchased, the product for sale corresponding to the broadcast advertisement shown on the at least one channel.

DETAILED DESCRIPTION

Embodiments discussed herein are directed to providing interactive advertising to a viewer of a television broadcast or other program service transmission through a product offering advertisement. As used herein, a "product offering advertisement" is an advertisement that gives specific details regarding a sale of a particular product or a retailer that offers a particular product. In one embodiment, a product offering advertisement may be shown concurrently with a broadcast advertisement that features the product that is featured in the product offering advertisement. As used herein, "broadcast advertisement" is an advertisement that is aired or otherwise shown on a channel of a particular program service. A product offering advertisement may be displayed in areas that are visible to a user such as a front panel screen of a receiver or on a display device otherwise used to display content associated with a program service transmission.

As used herein, a "receiver" may be any device capable of receiving video and/or audio content included in a broadcast or other program service transmission from a service provider. For example, a receiver may include a set-top box, a cable box, a television, a raster that receives streaming video general purpose computer, and so on. As used herein, a service provider may include any service that provides a program service transmission to a receiver such as, without limitation, a satellite television service, a direct television service or a cable television service. It should be understood that the term "program service transmission" generally embraces not only satellite or terrestrial broadcasts, unicasts and/or narrowcasts but also transmission of information across any wired or wireless transmission medium. Accordingly, a "program service transmission" encompasses transmission of information across a cable network (for example a cable headend to cable receiver), an Internet or other computer-accessible medium (including a local area network, wide-area network, and so on), including Internet protocol television transmissions, a wireless network such as a radio frequency (including satellite) or infrared network, and so on.

Figure 1:
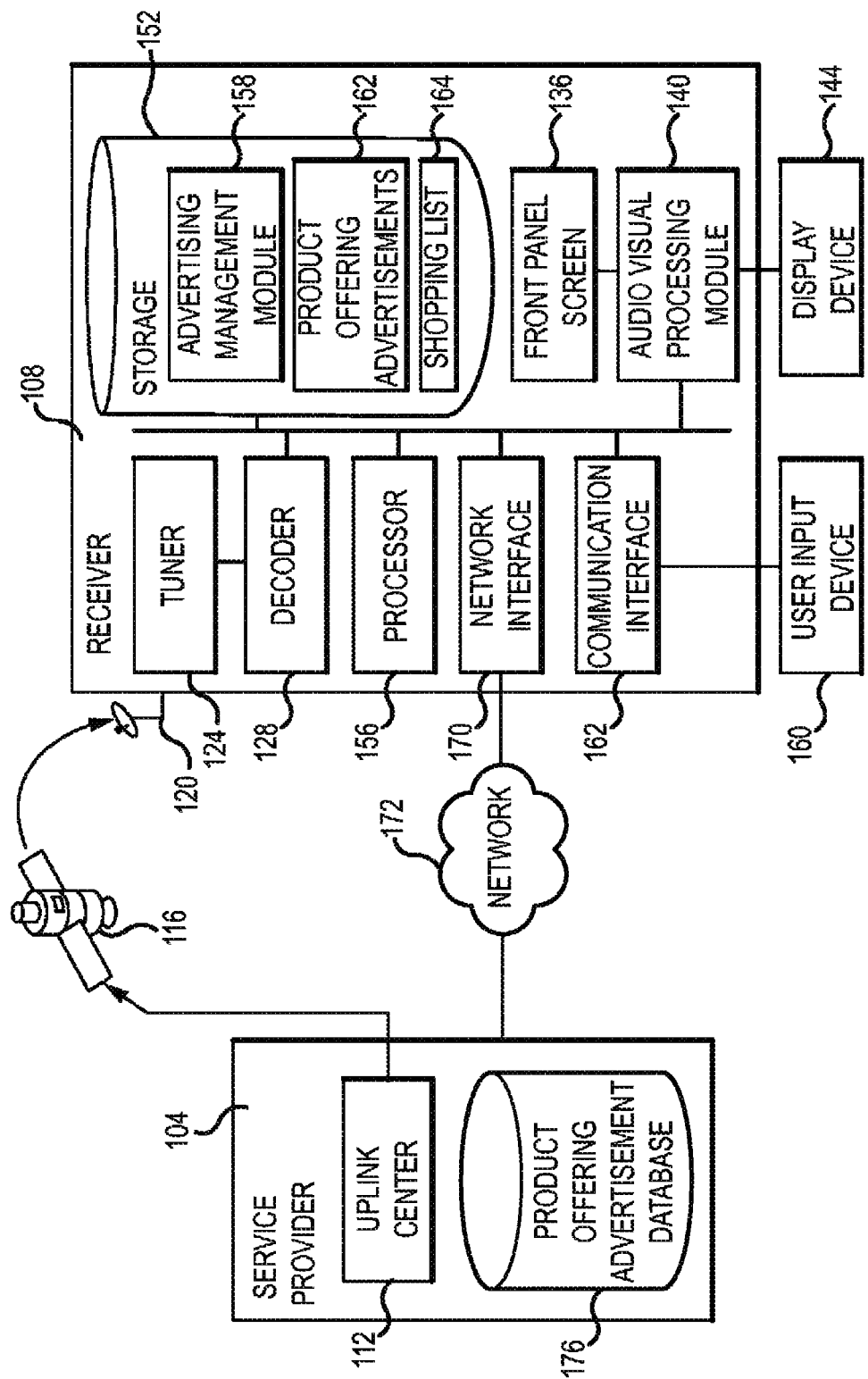
FIG. 1 is illustration of an operating environment showing components and features of implementations discussed herein.

FIG. 1 is a schematic illustration of a general operating environment showing components and features of embodiments discussed herein. FIG. 1 includes a service provider 104 that transmits or otherwise provides a program service transmission to a receiver 108. The receiver 108 may be associated with an individual, business or other entity, user or subscriber that receives a program service transmission from the service provider 104. The program service transmission may be received through a subscription to the service. Generally, the terms "user" and/or "subscriber" refer to an individual or company who receives a program service transmission. This may include those who have purchased a subscription to the program service transmission. Alternatively, the terms "user" and/or "subscriber" may refer to individuals who have been given access to the program service transmission through promotional offers and/or other non-fee-based agreements.

In connection with embodiments that operate in the context of a satellite television service, the service provider 104 may provide a program service transmission through an uplink center 112. Implementations discussed herein may utilize a direct broadcast satellite (DBS) system which can incorporate packetized transmission of signals according to an appropriate standard, such as the MPEG-2 and/or MPEG-4 standards. The uplink center 112 may include a transmitter or other equipment operable to transmit a modulated signal having data representing audio and/or visual content. The modulated signal may be received at a satellite 116, which in turn retransmits the modulated signal to be received at one or more terrestrial locations. The retransmitted signal may be received from the satellite 116 at one or more satellite dishes 120, which are typically associated with one or more receivers 108. A receiver 108 may include a tuner 124 operable to receive the program service transmission signal through the satellite dish 120 and a decoder 128 to decode the received signal. The decoder 128 may be programmed to decrypt, demodulate, demultiplex or otherwise decode some or all of the received signals in accordance with purchases and selections made by a user. Output from the decoder 128 may be directed to an audio visual (A/V) processing module 140. The A/V processing module 140 may process the video and audio streams using digital-to-analog conversion techniques, or compressed digital to uncompressed digital conversion techniques, to produce one or more output signals.

The audio visual processing module 140 may provide output to a front panel screen 136 and/or to a display device 144. The display device 144 may be a television, a monitor, a projector, or other device suitable to display content from a television broadcast or other program service transmission received by the receiver 108. The front panel screen 136 may be disposed on the front side or other visible portion of the receiver 108 and may be implemented using a liquid crystal display (LCD) or other appropriate technology. The front panel screen 136 may be used to display information regarding the program service transmission, such as a number designating a currently displayed channel. Output from the audio visual processing module 140 may include signals directed to the display device 144 that may include a particular channel of the program service transmission and signals directed to either the front panel screen 136 or the display device 144 that include one or more product offering advertisements.

Again, it should be noted that embodiments may operate with different product transmission services. Accordingly, although a satellite system is provided as an example of a program service transmission system, it should be understood that other networks or broadcasts for transmitting data may be used by alternative embodiments. For example, embodiments may be implemented in connection with a cable service. In this case, the service provider 104 and the receiver 108 may communicate over a communication path that includes various combinations of local and wide area networks, coaxial cable, fiber optics and/or the Internet.

The receiver 108 may include or be associated with a memory or other storage device 152, such as magnetic or optical storage. The storage device 152 may be operable to store data received from the decoded broadcast signal. The storage device 152 may be volatile or non-volatile memory implemented using any suitable technique or technology such as, for example, random access memory (RAM), disk storage, flash memory, solid state and so on. The storage device 152 may be located within the receiver 108 or separately from the receiver 108. The storage device 152 may removable in nature. The stored data set may include audio and/or visual content to be transmitted and output through the display device 144 or other device output device. Generally, audio/visual content may include still images, video images, animation and/or audio. Portable Network Graphics (PNG) or other appropriate formats, such as for example, Tagged Image File Format (TIFF), Joint Photographic Experts Group (JPEG), Motion Picture Experts Group (MPEG)-2, MPEG-4 may be used to display an image or video.

The receiver 108 may additionally include a processor 156 operable to run executable code in connection with various functions associated with the receiver 108. For example, the processor 156 may display graphics, images, animations or other content through the display device 144.

The storage device 152 may store a module, application, file, or other data that is useable by the processor 156. As used herein, a module includes processor executable code that may be run to carry out one or more functions associated with the receiver 108. "Processor executable code" includes any computer-readable media or commands that may be ultimately interpreted by a processor, such as HTML or XML files that are rendered into user-viewable applications by an application executed by the processor 156. In one instance, an advertising management module 158, which is stored in the storage device 152, may be executed by the processor 156 provide interactive advertising to a user by processing input received from a user input device 160 and/or by controlling the advertising content that is sent to the front panel display 136 or to the display device 144.

As used herein, a "user input device" may include any device operable to receive input from a user and to convey the input to the receiver 108. In one embodiment, the user input device 160 may be a hand-held device such as a remote control having a number of buttons or keys that when actuated by a user cause the user input device to convey information to the receiver 108 using a suitable wireless communication signal. Wireless signals that are sent to or received from the user input device 160 may be processed through a communication interface 162 associated with the receiver 108. The communication interface 162 may be operable to send and receive wireless signals such as radio frequency signals or infrared signals. The user input device 160 may include a pointing device or functionality that allows the user to control the position of a cursor that is displayed on the display device 144. For example, the user input device 160 may include a track ball or glide plane that may be manipulated to control cursor movements. The user input device 160 may include a motion sensor or accelerometer that allows a user to control displayed items or graphics, such as a cursor, through movements of his or her hand or arm that cause a displacement of the user input device 160. It should be appreciated that other input devices such as a computer mouse, capacitive touchpad or touch screen may be used and other communication means, wired or wireless, may be used.

Among other functions, the advertising management module 158 may receive and/or process user input that indicates a product selection. The user may enter product selections through the user input device 160 in a number of different manners. In some instances, a user may select a product that is featured in a currently displayed broadcast advertisement. Here, the user may press a designated button on the user input device 160 concurrently with the broadcast advertisement being displayed on the display device 144. In other instances, the user may enter a description or other details regarding a particular product through a dedicated graphical menu that is displayed on the display device 144. In response to receiving a product selection from the user, the advertising management module 158 may receive and/or select particular product offering advertisements that conform to the product selection entered by the user. Once product offering advertisements that conform to the product selection have been received and/or selected, these advertisements may be sent to either the front panel display 136 or the display device 160 for display to the user.

The advertising management module 158 may be provided in association with one or more product offering advertising 162 that are stored in the storage device 152. A particular product offering advertisement 162 may include text that describes a product offered for sale. The description may include such details as the name and location of the retailer that is offering the product for sale, the price of the product, and so on. Text associated with the product offering advertisement 162 may be displayed on the front panel display 136. In other embodiments, pictures, videos, and/or text associated with the product offering advertisement 162 may displayed on the display device 136. In accordance with other embodiments, one or more product offering advertisement 162 may be received and displayed upon receipt without the product offering advertisements being stored in the storage device 152. In this way, the advertising management module 158 operate in a streaming mode in which new product offering advertisements are received and displayed in real-time.

The service provider 104 may include a product offering advertisement database 176. The service provider 104 may provide the product offering advertisements 162 to the receiver 108 as part of a data transfer that is sent through the satellite 116. Here, the receiver 108 may receive a downlinked satellite signal that includes the data transferred on a designated line in the vertical blanking interval (VBI) or other portion of the broadcast service transmission that does not interfere with other transmitted content. The product offering advertisements sent in this manner may feature offerings of products for sale that are featured in broadcast advertisements. In other instances, the service provider 104 may provide the product offering advertisement to the receiver 104 across a data network, such as the Internet.

In connection with receiving data transfers from the service provider, a particular receiver 108 may include a network interface 170. The network interface 170 may be generally operable to communicate or send information across a network 172. In accordance with certain embodiments discussed herein, the network interface 170 may include a modem. Using a modem, the receiver may communication over a network 172 that includes standard telephone lines associated with the public switched telephone network (PSTN). However, it should be appreciated that the network 172 may include any type of network capable of data communication, such as for example, a local or wide area network, cell phone network or the Internet. In this regard, the receiver 108 may communicate through the network interface 170 using any suitable communication protocol such as TCP/IP. Through the network interface 170, a user may communicate with the service provider 104 to change his or her account status including taking such actions as adding or canceling channels and/or ordering pay-per-view content. The network interface 170 may additionally be used to facilitate communication between the receiver 108 and the product offering advertisement database 176.

Figure 2:
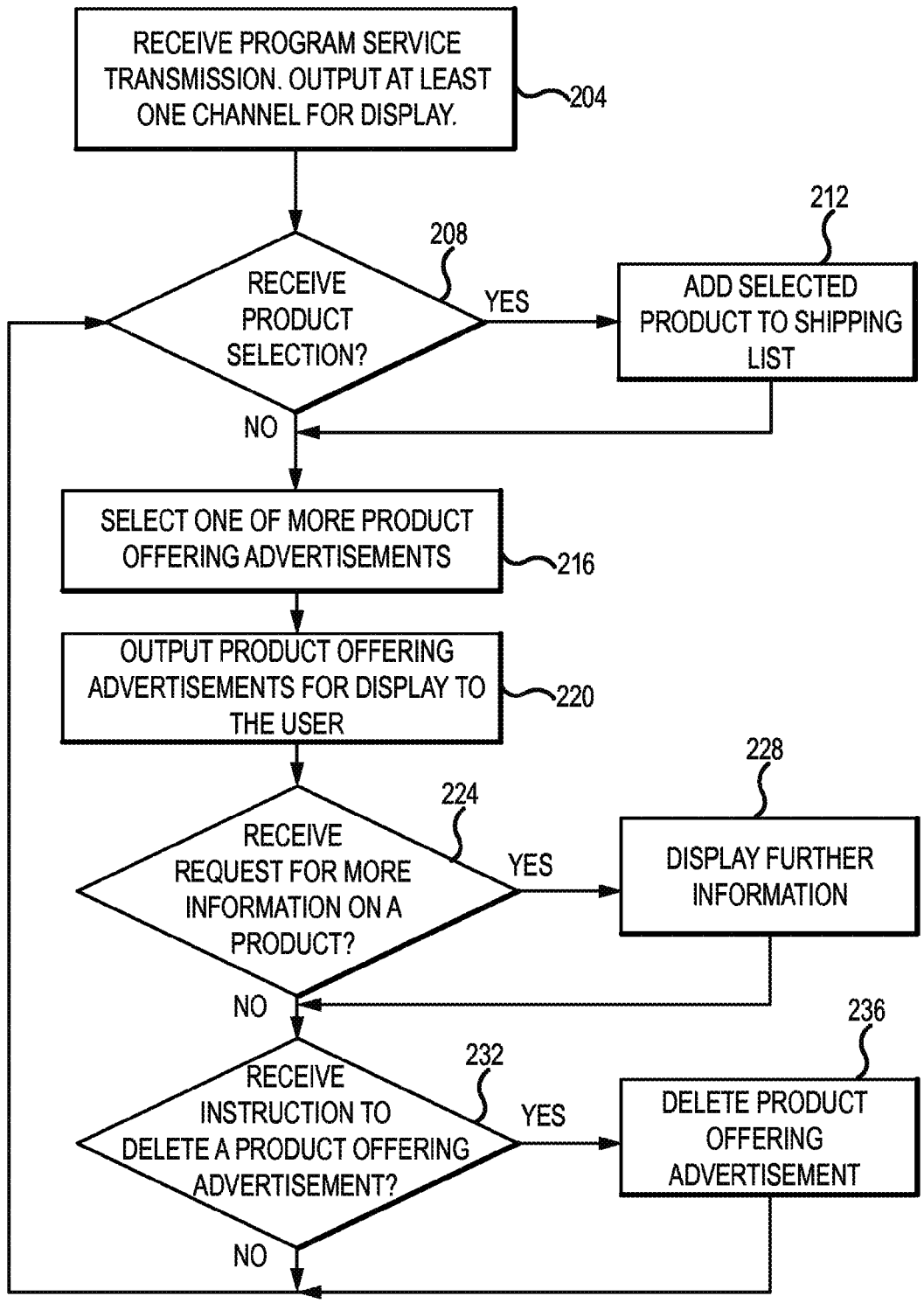
FIG. 2 is a flow chart illustrating a method in accordance with embodiments discussed herein.
Figure 3:
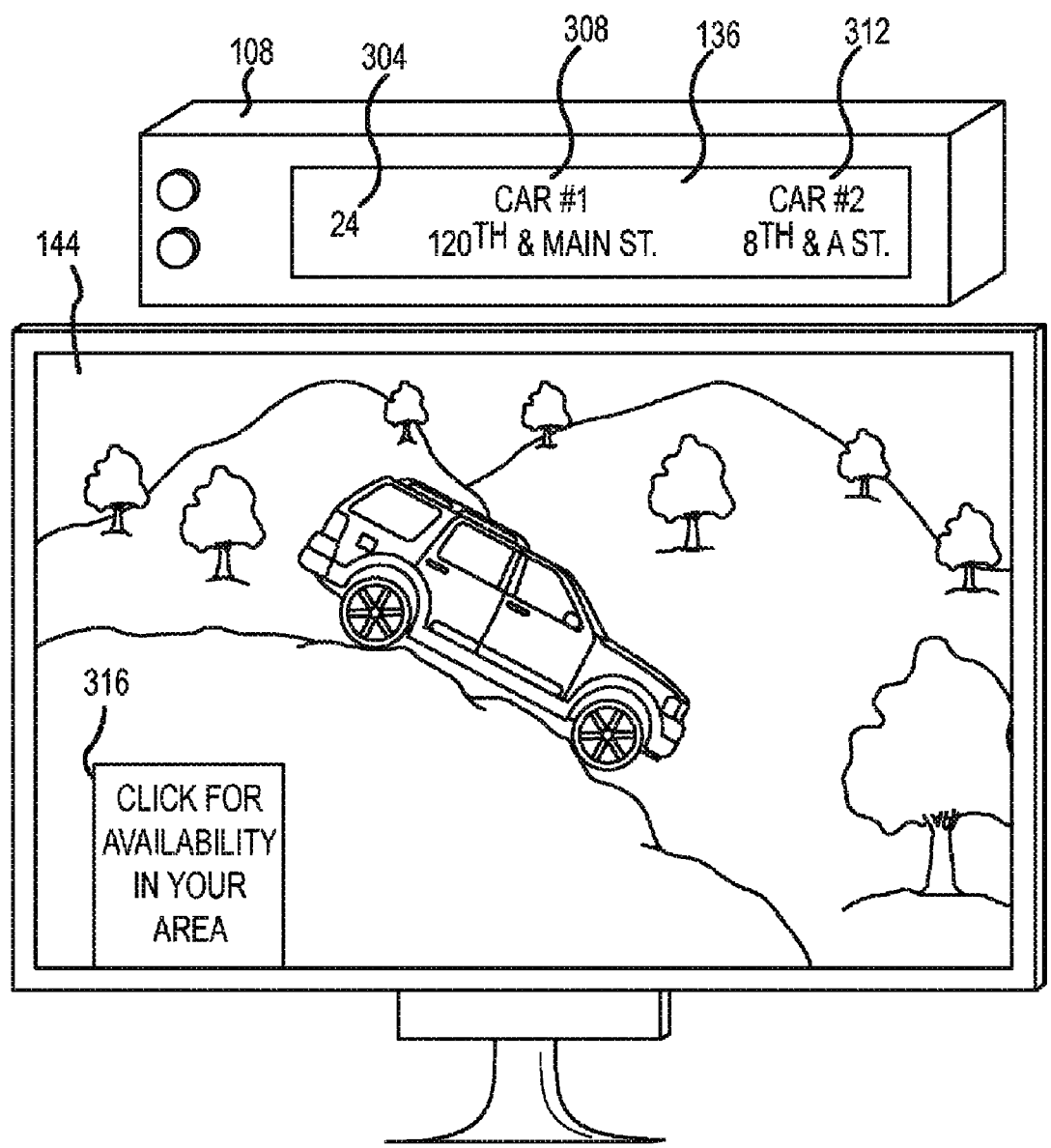
FIG. 3 is an illustration of output from a receiver and a display device in accordance with embodiments discussed herein.
Figure 4:
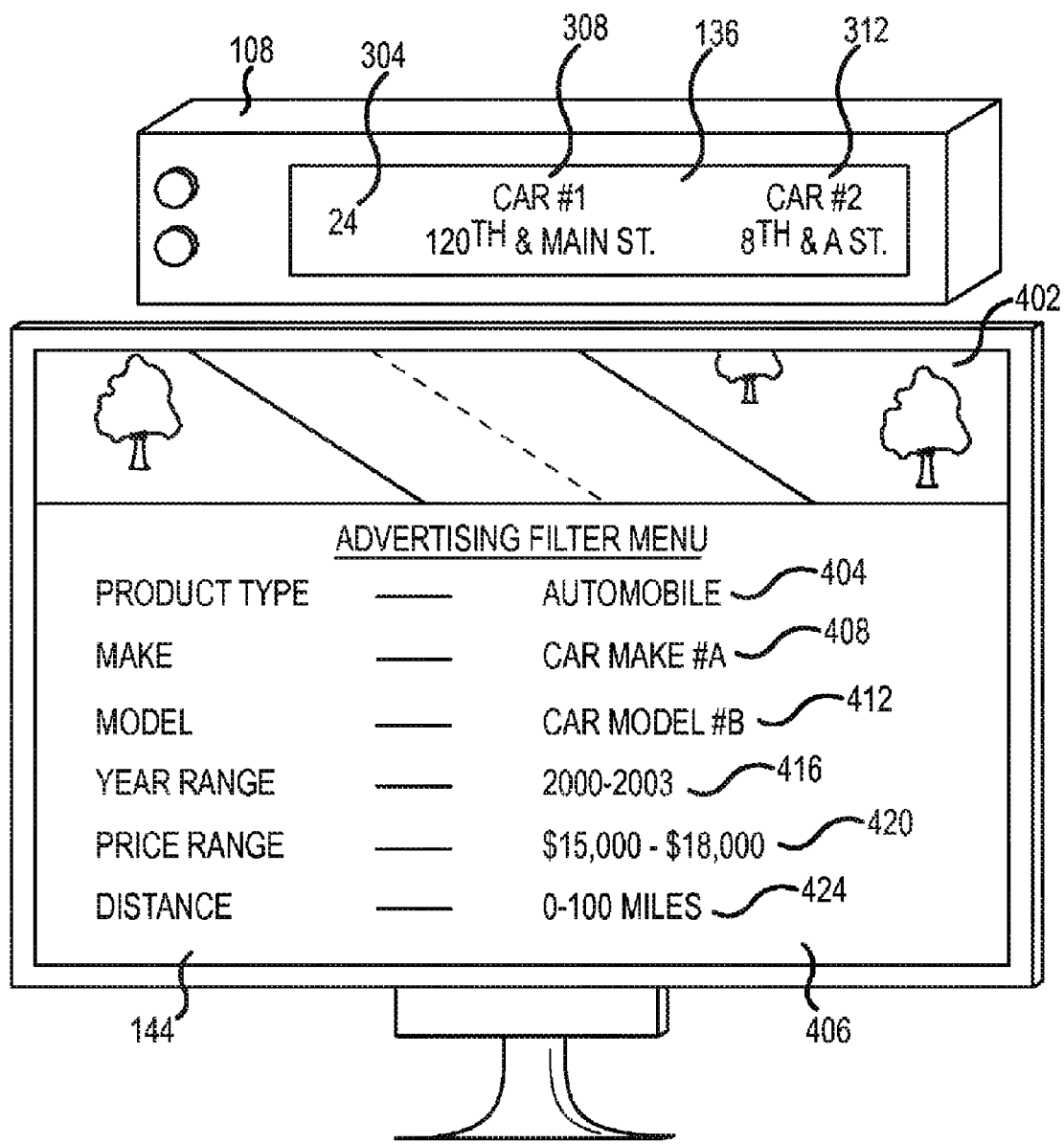
FIG. 4 is another illustration of output from a receiver and a display device in accordance with embodiments discussed herein.

FIG. 2 is a flow chart that illustrates an operation of the advertising management module 158 in accordance with embodiments discussed herein. Initially, at operation 204 the receiver 108 receives a program service transmission from the service provider 104 and displays content from the transmission on the display device 144. Following operation 204, operation 208 may be executed. In operation 208, the advertising management module 158 processes signals received from the user input device 160 to determine if a user has selected a particular product. As discussed in greater detail below, FIG. 3 illustrates an embodiment in which the user selects a particular product that is featured in a broadcast advertisement; and FIG. 4 illustrates an embodiment in which the user selects a particular product through the use of an advertising filter menu or other dedicated graphical user interface.

If, in operation 208, a product selection is received, operation 212 may be executed. In operation 212, the advertising management module 158 may add the user's product selection to a shopping list 164 or other data structure which contains items selected by the user. Each item in the shopping list 164 may contain specific details of a desired product, such as would be entered through the advertising filter menu (shown in greater detail in FIG. 4). Alternatively or in combination, the shopping list 164 may include a product name or other information provided by a service provider 104 when a user selects a product featured in a broadcast advertisement (shown in greater in FIG. 3). The shopping list 164 may be maintained in the storage device 152 and referred to over time by the advertising management module 158 in order to display product offering advertisements 162 in accordance with user product selections.

Following either operation 208 or operation 212, operation 216 may be executed. In operation 216, the advertising management module 158 selects one or more product offering advertisements 162. In some instances the service provider 104 may push particular product offering advertisements 162 to the receiver 108, which in turn stores the product offering advertisements in the storage device 152. In this instance, one or more of the product offering advertisement 162 stored in the storage device 152 may be for products that do not correspond to user selections. Accordingly, in operation 216, the advertising management module 158 may compare the stored product offering advertisements 162 to the shopping list 164, which contains product selections entered by the user. In other instances, the service provider 104 may pull a particular product offering advertisements 162 from the service provider 104. Here, operation 216 may include a network transaction that queries the product offering advertisement database 176. The query may be sent across the network 172 and may include specific product details or selections such as those received in operation 208. In response, the product offering advertisement database 176 may return specific product offering advertisements 162 that conform to the user's product selections. In one embodiment, this may include sending a return network transaction across the network 172. In other embodiments, this may include sending a return transaction via the satellite 116 to be received by the receiver 108 at the antenna 120.

In one embodiment, the advertising management module 158 may select a product offering advertising 162 based on a distance from the user's location. Specifically, a product offering advertising 162 may include geographic information regarding a location of a specific product sale or a retailer. For example, a product offering advertisement 162 for the sale of particular automobile may include a street address for a retailer who is selling the automobile. When selecting a product offering advertisements 162 for display to the user, the advertising management module 158 may compare the user's location to the geographic location provided in the product offering advertisements 162 and eliminate those that are outside of a certain distance. The distance used to select product offering advertisements 162 may be selected by the user or may be a default value.

Following operation 216, operation 220 may be executed. In operation 220, the advertising management module 158 outputs product offering advertisements 162 for display to the user. In one embodiment, operation 220 may include outputting product offering advertisements to a front panel screen 136 that is disposed on a visible surface of the receiver 108. Alternatively or in combination, operation 220 may include outputting a product offering advertisement 162 to a display device otherwise used to display content associated with a program service transmission.

Figure 5:
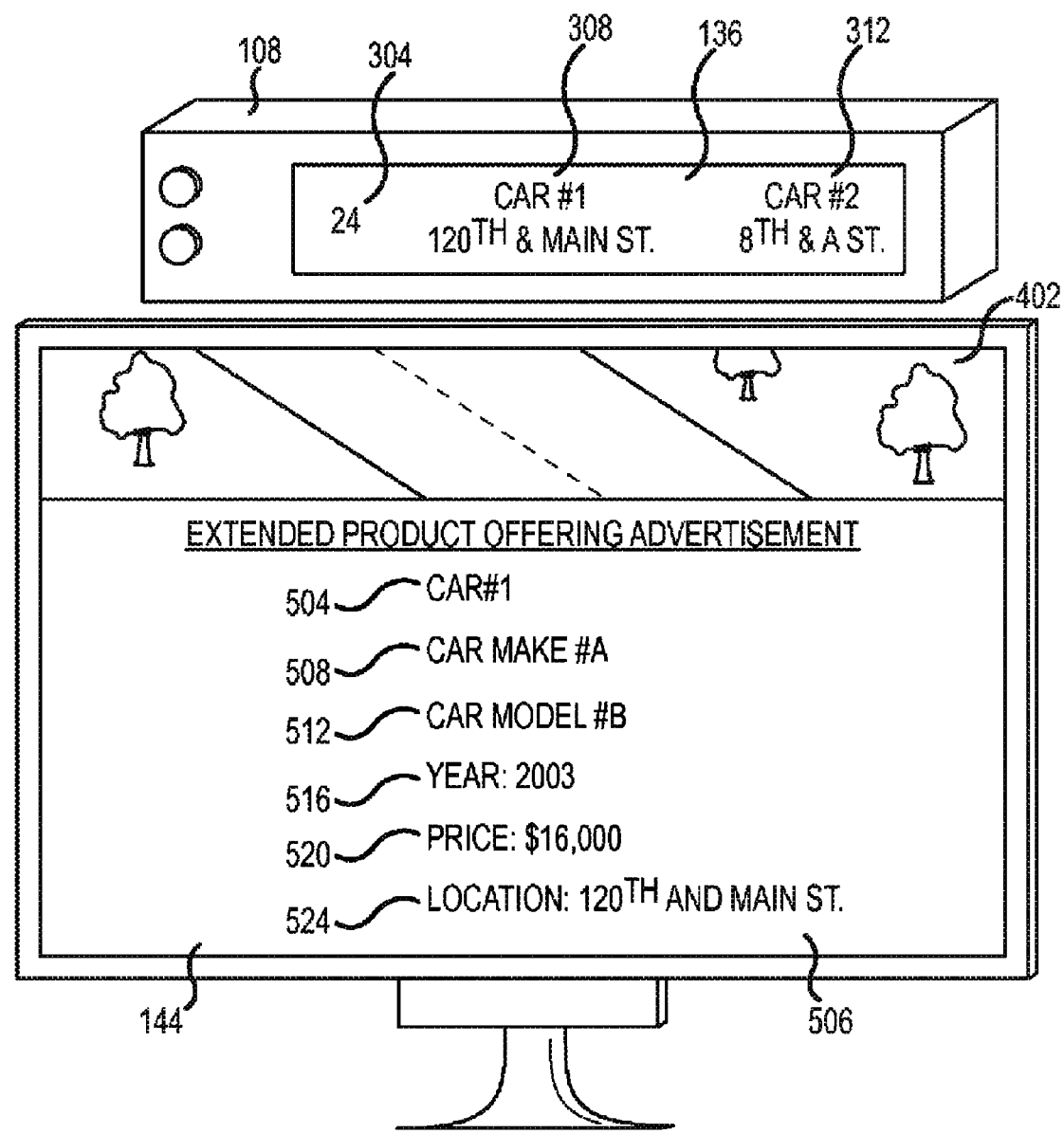
FIG. 5 is still another illustration of output from a receiver and a display device in accordance with embodiments discussed herein.

Following operation 220, operation 224 may be executed. In operation 224, the advertising management module 158 determines if a request is received from a user for more information on a product. A user may make such a request by selecting a particular displayed product offering advertisement and entering an appropriate command through the user input device 160. If the advertising management module 158 receives such a command in operation 224, then operation 228 may be executed. In operation 228, the advertising management module 158 may output an extended product offering advertisement having further information regarding a product for sale that is featured in a product offering advertisement selected by a user. An example extended product offering advertisement is illustrated in FIG. 5 and is discussed in greater detail below.

Following either operation 224 or operation 228, operation 232 may be executed. In operation 232, the advertising management module 158 makes a determination as to whether a particular product offering advertisement is deleted by a user command. Here, the user may view details of the product offering advertisement and determine that the product offered for sale does not meet his specific requirements. For example, an automobile may be an undesired make or model or may be too highly priced. The user may view such product information through, for example, a product offering advertisement shown on the front panel display 136 (as shown in FIG. 3) or through and extended product offering advertisement shown on the display device 144 (as shown in FIG. 5). The user may delete an unwanted product offering advertisement and, in response, the product advertising management module 158 may delete the product offering advertisement 162 from the storage device 152. Accordingly, in subsequent displays of product offering advertisements, the deleted advertisement will not be included. Following either operation 232 or operation 236, the method may proceed to operation 208 to thereby repeat the operations set forth in FIG. 2. Specifically, the advertisement management module 158 may again receive input for product selections during the display of a particular channel of the program service transmission.

FIG. 3 is an illustration of output from the receiver 108 to the front panel display 136 and to the display device 144 in accordance with embodiments discussed herein. The output shown in FIG. 3 illustrates one manner in which a user may select a product for inclusion in the shopping list 164. As shown in FIG. 3, the user may select a particular product that is featured in a broadcast advertisement. By way of illustration, FIG. 3 shows a display device 144 that is showing a broadcast advertisement for an automobile. As the broadcast advertisement shows on the display device 144, the advertising management module 158 may be enabled or configured to receive user input that selects the featured automobile. For example, if a user presses a designated button on the user input device 160 during the broadcast advertisement, the advertising management module 158 may interpret that input as a selection of the automobile. Alternatively or in combination, the receiver 108 may output a pop-up 316 or other icon that is overlain or otherwise displayed on the display device 144 currently with the broadcast advertisement. In order to select the product featured in the broadcast advertisement, a user may select the pop-up 316 or icon using a cursor or pointer associated with the user input device 160.

In another embodiment, the user may select a particular product through the use of a dedicated graphical user interface (GUI). By way of illustration, FIG. 4 shows a display device 144 that is shows an advertising filter menu 406 implemented as part of a graphical user interface. The advertising filter menu 406 may be activated by a user by appropriate commands entered through the user input device 160. The advertising filter menu 406 may be displayed on some or all of the screen of the display device 144. In one embodiment, the advertising filer menu 406 may occupy a window or other portion of the screen, while other content 402 form the program service is displayed on the remainder of the screen.

As shown in FIG. 4, the advertising menu 406 may include a number of menu items that allow a user to specify one or more desired product characteristics. By way of example and not limitation, the advertising filter menu 406 shown in FIG. 4 includes a "product type" menu item 404. In this example, the user has selected "Automobile" as a product type. Related to an automobile product type, the advertising filter menu 406 may additionally include a "make" menu item 408, a "model" menu item 412, a "year range" 416 menu item. In this example, the user has selected an automobile of make "A" and model "B" that is made anywhere between 2000 to 2005. For any product type, the advertising filter menu 406 may include menu items such as a "price range" menu item 420 and a distance menu item 424. In this example, the user has selected a price range of $15,000 to $18,000 and has specified that he only wishes to view product sales that are located within 100 miles of his location.

Once one or more user product selections have been received by the advertising management module 158 and the appropriate descriptive information stored in the shopping list 164, the advertising management module 158 may output product offering advertisements that conform to user selections. As shown in FIG. 3 and FIG. 4, the receiver 108 includes a front panel screen 136 that includes a channel indication 304. In addition to the channel indication 304, the front panel screen 136 includes a first product offering advertisement 308 for "car #1" and a second product offering advertisement 312 for "car #2." A product offering advertisement shown on the front panel screen 136 may be a text display that includes one or more details associated with a specific offer for sale of the product. For example, the first product offering advertisement 308 and the second product offering advertisement 312 include an address where the featured automobile may be purchased. The first product offering advertisement 308 specifies that car #1 may be purchased at "120th and Main Street." The second product offering advertisement 312 specifies that car #2 may be purchased at "8th and A Street".

It should be appreciated that displaying product offering advertisements on the front panel screen 136 is by way an example and not limitation. In other embodiments, operation 220 may include sending a particular product offering advertisement for display on the display device 144. Product offering advertisement sent to the display device 144 may feature an overlay of text or graphics on other content shown on the display device 144. Product offering advertisement shown on the display device 144 may be shown periodically or in response to the receipt of the new advertisement and so on.

Once one or more product offering advertisements are displayed to the user, the user may identify a particular product offering advertisement for which he would like to obtain further information. Referring to FIG. 3, a user may, for example, wish to view further information regarding car #1 featured in product offering advertisement 308. In this example, the user may determine from the product offering advertisement 308 shown on the front panel display 136 that car #1 is being sold at a convenient location and that he would therefore like to obtain more information regarding specific details of car #1 or the retailer that is offering car #1 for sale. Accordingly, the user may enter appropriate commands into the user input device 160 that selects the first product offering advertisement 308. In response, the advertising management module 158 may output an extended product offering advertisement 506 as shown in FIG. 5.

As shown in FIG. 5, the extended product offering advertisement 506 may be overlain on a display of other content 402 associated with the program service transmission. The extended product offering advertisement 506 may feature a number of product details associated with the selected product. By way of example, the extended product offering advertisement 506 shown in FIG. 5 includes a product name 504, an automobile make 508, an automobile model 512, automobile year 516, a price 520, and a location 524. As can be seen in FIG. 5, the extended product offering advertisement 506 indicates that car #1 is of make "A" and model "B," made in year 2003, offered for sale at $16,000, and is located at "120th and Main Street."

It should be emphasized that the products featured in product offering advertisements shown on the front panel display 136 may not necessarily be shown concurrently with a corresponding broadcast advertisement for the same product shown on display device 144. Specifically, the product offering advertisements 308 and 312 may be displayed periodically to the user regardless of the content of the currently displayed channel on the display device 144. In some instances, the receiver 108 may receive a new product offering advertisement from the product offering advertisement database 176 that corresponds to a particular product selection entered by the user at some time in the past. The front panel display 136 may then be used to display the recently received product offering advertisement to the user immediately upon receipt. The new or recently received product offering advertisement may be delivered through a pop-up or highlighted in an appropriate manner to indicate to the user that the product offering advertisement is recently received and therefore features a new offering for sale. In other embodiments, the user may enter a command through the user input device 160 that indicates or specifies that the advertising management module 158 should output all currently held product offering advertisements 162 that conform to the user's product selections. In this embodiment, the front panel screen 136 may display a banner or other running display of a number of product offering advertisements that conform to the user's request or command.

Figure 6:
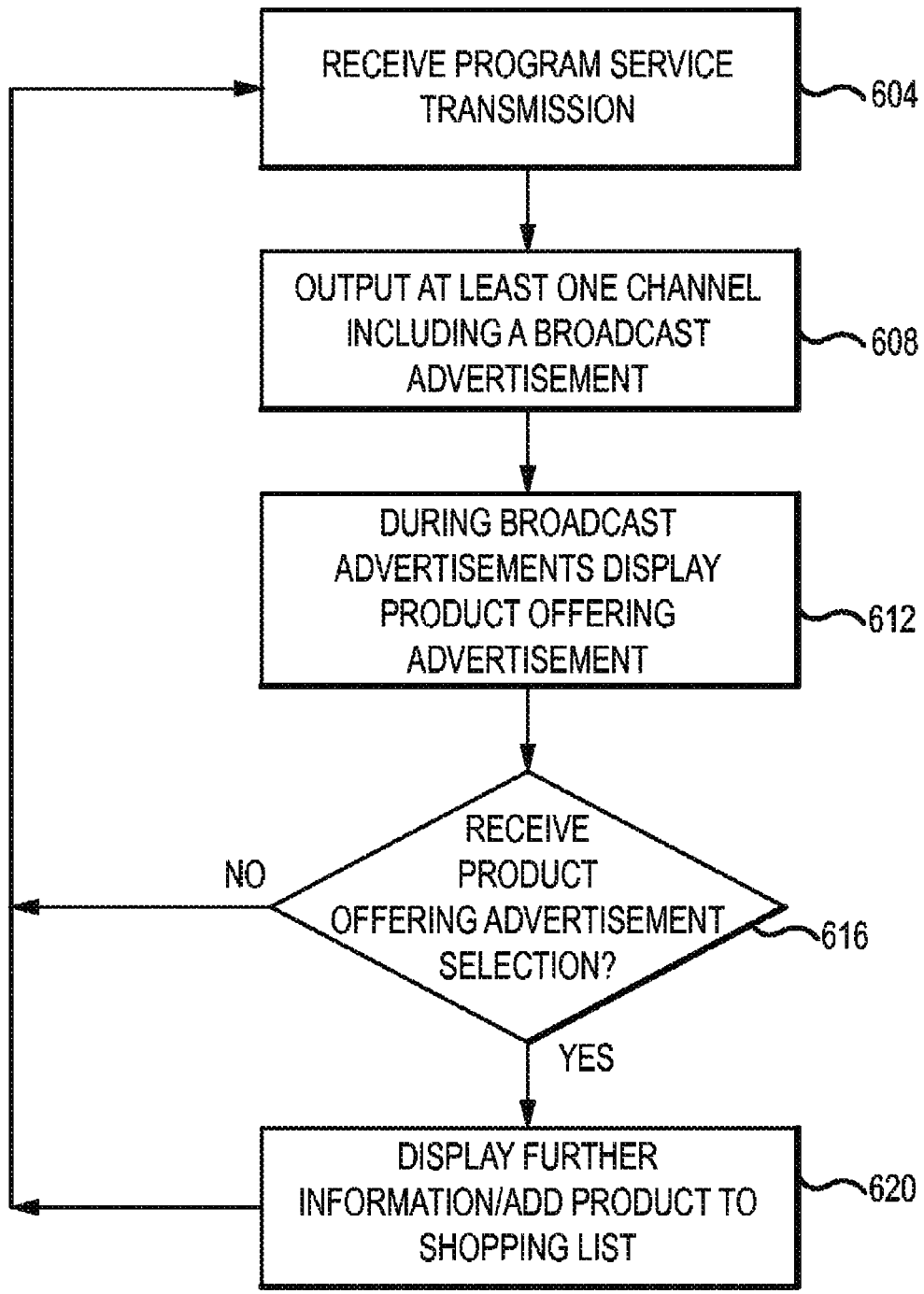
FIG. 6 is another flow chart illustrating a method in accordance with embodiments discussed herein.

The method illustrated in FIG. 2 includes displaying a particular product offering advertisements that conform to user product selections. In other embodiments, the advertising management module 158 may output product offering advertisements regardless of user input. In this instance, the service provider 104 may push a particular product offering advertisement 162 to the receiver 108 so that it may be displayed in accordance with priorities specified by the service provider 104. In accordance with this embodiment, FIG. 6 illustrates a method that operates to display a product offering advertisement without specific user inputs.

Initially, at operation 604, the receiver 108 receives a program service transmission from the service provider 104. Following operation 604, operation 608 may be executed. In operation 608, the receiver may output at least one channel included in the program service transmission. In operation 608, the channel output by the receiver may include at least one broadcast advertisement. The program service transmission received in operation 604 may include particular product offering advertisements sent in a data transmission, for example, through the vertical blanking interval portion of the broadcast transmission. These product offering advertisements may be stored in storage 152. The stored product offering advertisements 162 may include specifications as to when during a particular program service they should be displayed to the user. Specifically, the product offering advertisements may be displayed concurrently with a similar product that is featured in the broadcast advertisement shown on the display device 144.

Following operation 608, operation 612 may be executed. In operation 612, the advertising management module 158 may display a particular product offering advertisement that features a product shown in the broadcast advertisement. Concurrently with this broadcast or display, the product offering advertisement for the same product may be displayed on the front panel display 136. For example, the broadcast advertisement may feature a new model of car that is available from a certain automobile manufacturer. A product offering advertisement that may be shown concurrently with the broadcast advertisement may feature a specific sale or retailer that is offering the new car model. The product offering advertisement may include various details associated with the sale, such as the location of the retailer, the price of the car, the currently available colors, and so on.

Following operation 612, operation 616 may be executed. In operation 616, the advertising management module 158 may process input received from user input device to determine that a user has selected a particular product offering advertisement. Following operation 616, operation 620 may be executed. In operation 620, the advertising management module 158 may display further information regarding the selected the product offering advertisement. Additionally, the advertising management module 158 may add the product to the shopping list 164 stored in the storage device 158.

It should be appreciated that automobiles sales are by way example and not limitation. Product offering advertisements may be used to inform a viewer regarding sales for any type of product. For example, product offering advertisements may be provided that feature such products as video games, fast food items, feature films, and so on. By way of further example, a broadcast advertisement may feature a new release of a feature film. Concurrently with this broadcast advertisement, one or more product offering advertisements may be displayed that each feature a specific theater that is currently showing the new feature film.

While embodiments are discussed herein in connection with the exemplary satellite broadcast system shown in FIG. 1, it should be appreciated that embodiments may be used in connection other types of networks or content delivery mechanisms. Generally, the disclosure includes content delivered from a provider to a receiver across or over a network. The network across which content may be delivered may include satellite system, such as the one shown in FIG. 1. Alternatively, the network may include a cable television network, local area network, wide area network or the Internet. In connection with certain embodiments, a receiver may include a general purpose computer operable to receive data or other content across a network, such as a wide area network of the internet. In such embodiments, the computer may be configured so that a provider can access a web site, a file transfer protocol (FTP) site, a file sharing system or site, and so on. Moreover, the order of method operations, such those shown in FIG. 2 and FIG. 6, described herein is by way of example and limitation. Certain implementations may reorder method operations without departing from the spirit and scope of the disclosure.

The invention claimed is:

1. A receiver, comprising:
a tuner operable to receive a program service transmission comprising content for a plurality of channels and a plurality of product offering advertisements, the plurality of product offering advertisements transferred in one or more vertical blanking intervals, the tuner operable to select one channel of the plurality of channels responsive to a signal received from an input device and to prepare the one channel to be output in a data signal to an external display device;
a memory connected to the tuner, the memory including a tangible storage medium operable to store computer-readable data and instructions, the memory storing the plurality of product offering advertisements;
a processor connected to the memory and operable to run computer-executable code stored in the memory, the processor further operable to:
 process the plurality of product offering advertisements and store the plurality of product offering advertisements in the memory;
 output an advertising filter menu for display to the external display device;
 process one or more selections made with the advertising filter menu, the one or more selections corresponding to one or more product characteristics;
 identify a location corresponding to a user;
 identify respective location specifications associated with the plurality of product offering advertisements; and
 select a subset of the plurality of product offering advertisements based at least in part on i) the one or more selections corresponding to one or more product characteristics, ii) the location corresponding to the user, iii) respective location specifications associated with the plurality of product offering advertisements, and iv) a threshold distance, and eliminate at least one product offering advertisement from the subset;
 process input received from the input device to determine a product selection and to select at least a second product offering advertisement of the subset of the plurality of product offering advertisements that conforms to the product selection, where the input is received responsive to a display of a first advertisement, and the subset of the plurality of product offering advertisements are directed to at least one product corresponding to the product selection; and
an audio visual module connected to the tuner and to the processor, the audio visual module operable to output the second product offering advertisement that conforms to the product selection for display to the user;
wherein the processor is operable to process a second input received from the input device responsive to the output of the subset of the plurality of product offering advertisements, and the audio visual module is operable to output a third advertisement responsive to the second input, the third advertisement directed to another product that is similar to the at least one product and that is selected based at least in part on one or more previous user selections made via the receiver.

2. The receiver of claim 1, further comprising:
a display screen connected to the audio visual module, wherein the audio visual module is operable to send the one or more product offering advertisements that conform to the product selection to the display screen for display to the user.

3. The receiver of claim 1, wherein the audio visual module is operable to send the one or more of the product offering advertisements that conform to the product selection to the external display device for display to the user.

4. The receiver of claim 1, further comprising:
a network connection operable to communicate with a remote product offering database;
wherein the processor is further operable to query the remote product offering database through the network connection, the query including a product specification, and the remote product offering database is operable return product offering advertisements that conform to the product specification.

5. The receiver of claim 1, wherein:
each product offering advertisement of the one or more product offering advertisements includes a description of a product for sale and a location where the product may be purchased; and
the processor is further operable to determine that a particular product offering advertisement conforms to the product selection if the location where the product may be purchased is within a predetermined distance.

6. The receiver of claim 1, wherein:
the processor is further operable to process a third input from the input device to determine that the user has requested further information for the another product; and
the audio visual module is operable to output an extended advertisement to the external display device in response to the third input, the extended advertisement corresponding to the third advertisement and including further product information not contained in the third advertisement.

7. A method for providing an interactive advertisement, comprising:
receiving a program service transmission at a receiver, the program service transmission comprising content for a plurality of channels and a plurality of product offering advertisements, the plurality of product offering advertisements transferred in one or more vertical blanking intervals;
outputting at least one channel of the plurality of channels from the receiver for display on a display device;
processing the plurality of product offering advertisements and store the plurality of product offering advertisements in memory;
outputting an advertising filter menu for display to the display device;
processing one or more selections made with the advertising filter menu, the one or more selections corresponding to one or more product characteristics;
identifying a location corresponding to a user;
identifying respective location specifications associated with the plurality of product offering advertisements; and
selecting a subset of the plurality of product offering advertisements based at least in part on i) the one or more selections corresponding to one or more product characteristics, ii) the location corresponding to the user, iii) respective location specifications associated with the plurality of product offering advertisements, and iv) a threshold distance, and eliminate at least one product offering advertisement from the subset;
processing user input received by the receiver to determine a product selection, where the user input is received responsive to a display of a first advertisement;
selecting at least a second product offering advertisement of the subset of the plurality of product offering advertisements that conforms to the product selection;
outputting from the receiver the second product offering advertisement, the second product offering advertisement including a product for sale conforming to the product selection;
receiving a second user input responsive to the output of the subset of the plurality of product offering advertisements; and
outputting a third advertisement responsive to the second user input, the third advertisement directed to another product that is similar to the product and that is selected based at least in part on one or more previous user selections made via the receiver.

8. The method of claim 7, wherein the display of the first advertisement is a display of a broadcast advertisement shown on the at least one channel, the product selected by the user input corresponding to a product shown in the broadcast advertisement.

9. The method of claim 8, wherein:
the program service transmission includes a plurality of product offering advertisements for products that are featured in broadcast advertisements shown on at least one channel of the plurality of channels of the program service transmission; and
the second product offering advertisement output from the receiver for display is chosen from the plurality of product advertisements received through the product service transmission.

10. The method of claim 7, wherein:
the advertising filter menu is operable to allow the user to enter the one or more product characteristics; and
a second product selection includes the one or more product characteristics entered through the advertising filter menu.

11. The method of claim 10, further comprising:
receiving, at the receiver, a plurality of candidate product offering advertisements; and
outputting for display to the user those candidate advertisements that conform to the one or more product characteristics entered by the user through the advertising filter menu.

12. The method of claim 10, further comprising:
transmitting, from the receiver to a service provider, a list of product characteristics entered by the user through the advertising filter menu;
evaluating, at the service provider, a number of candidate product offering advertisements based on the list of product characteristics received from the receiver; and
transmitting, from the service provider to the receiver, only those candidate product advertisements that conform to the list of product characteristics received from the receiver.

13. The method of claim 10, wherein the advertising filter menu is operable to receive a price range as a product characteristic.

14. The method of claim 10, wherein the advertising filter menu is operable to receive a geographic distance as a product characteristic.

15. The method of claim 7, further comprising:

storing the product selection in a memory device associated with the receiver;

receiving a number of new product offering advertisements over time at the receiver;

comparing each new product offering advertisement of the number of new product offering advertisements to the product selection stored in the memory device to determine if a respective product corresponding to the new product offering advertisement conforms to the product selection; and if the new product offering advertisement conforms to the product selection, outputting an advertising alert to the user.

16. The method claim 7, further comprising:

repeating an operation corresponding to the outputting the second product offering advertisement for display to the user after a predetermined time interval.

17. The method of claim 16, further comprising:

in response to the repeating the operation corresponding to the outputting the second product offering advertisement, receiving an advertisement deletion from an user input device, the advertisement deletion indicating a particular display of the second product offering advertisement; and in response to receiving the advertisement deletion, no longer outputting the second product offering advertisement for display to the user.

18. A method for providing an interactive advertisement, comprising:

receiving a program service transmission at a receiver, the program service transmission comprising content for a plurality of channels and a plurality of product offering advertisements for products that are featured in broadcast advertisements shown on at least one channel of the plurality of channels of the program service transmission, the plurality of product offering advertisements transferred in one or more vertical blanking intervals;

processing the plurality of product offering advertisements and store the plurality of product offering advertisements in memory;

outputting an advertising filter menu for display to a display device;

processing one or more selections made with the advertising filter menu, the one or more selections corresponding to one or more product characteristics;

identifying a location corresponding to a user;

identifying respective location specifications associated with the plurality of product offering advertisements; and selecting a subset of the plurality of product offering advertisements based at least in part on i) the one or more selections corresponding to one or more product characteristics, ii) the location corresponding to the user, iii) respective location specifications associated with the plurality of product offering advertisements, and iv) a threshold distance, and eliminate at least one product offering advertisement from the subset;

selecting at least a second product offering advertisement of the subset of the plurality of product offering advertisements that conforms to a product selection;

outputting the at least one channel of the plurality of channels from the receiver for display on the display device;

outputting from the receiver the second product offering advertisement during display of the at least one channel and a first advertisement, the second product offering advertisement including a product for sale corresponding to at least one broadcast advertisement of the broadcast advertisements shown on the at least one channel;

receiving a user input responsive to the output of the subset of the plurality of product offering advertisements; and outputting a third advertisement responsive to the user input, the third advertisement directed to another product that is similar to the product and that is selected based at least in part on one or more previous user selections made via the receiver.

19. The method of claim 18, further comprising:

receiving a second user input that corresponds to a request for further information for the third advertisement; and outputting an extended advertisement to the external display device in response to the second user input, the extended advertisement corresponding to the third advertisement and including further product information not contained in the third advertisement.

20. The method of claim 7, further comprising:

in response to the outputting the second product offering advertisement, receiving a product selection;

storing the product selection in a memory device associated with the receiver;

receiving a number of new product offering advertisements over time at the receiver; and comparing each new product offering advertisement of the number of new product offering advertisements to the product selection stored in the memory device to determine if a respective product corresponding to the new product offering advertisement conforms to the product selection; and if the new product offering advertisement conforms to the product selection, outputting an advertising alert to the user.

* * * * *